United States Patent [19]
Carpenter

[11] Patent Number: 5,251,182
[45] Date of Patent: Oct. 5, 1993

[54] HYDROPHONE CABLE CONSTRUCTION

[75] Inventor: Allan L. Carpenter, Surrey Downs, Australia

[73] Assignee: Australia Sonar Systems Pty Ltd, Technology Park, Australia

[21] Appl. No.: 867,483

[22] Filed: Apr. 10, 1992

[30] Foreign Application Priority Data

Apr. 11, 1991 [AU] Australia .................. PK5569

[51] Int. Cl.$^5$ .............................................. G01V 1/38
[52] U.S. Cl. ..................... 367/20; 367/154; 174/101.5
[58] Field of Search ........... 367/20, 153, 154, 178, 367/15; 174/101.5

[56] References Cited

U.S. PATENT DOCUMENTS

| | | | |
|---|---|---|---|
| 4,491,939 | 1/1985 | Carpenter | 367/20 |
| 4,736,345 | 4/1988 | Keckler et al. | 367/20 |
| 4,821,241 | 4/1989 | Berglund | 367/20 |
| 4,951,265 | 8/1990 | Buckles | 174/101.5 |

Primary Examiner—Ian J. Lobo
Attorney, Agent, or Firm—Oblon, Spivak, McClelland, Maier & Neustadt

[57] ABSTRACT

An acoustic sensor module, contains groups of single sensor elements within a fluid-tight enclosure. The enclosure is bounded by a reinforced hose wall and module end caps at either end of the module. The sensors are mounted in the center of the enclosure using tubular foam spacers; smaller cylindrical foam spacers fill the central space between sensors. Radial stiffness is provided to the spacers by thin annular rings held in place by fine strength cords. Thin flexible wires connect the sensor elements of each group to the preamplifying-/multiplexing electronic package, the connecting leads therefrom being brought out to the outer surface through a division between spacers. Data and power cables are spirally wrapped around the outer diameter, with an over-wrap of fine fiber or plastic tape to lock them into position. The connecting leads to the electronic packages are then spliced into their respective data/power cables. An inner jacket of flexible, low density, acoustically damping thermoplastic material is then extruded over the assembly described above, encapsulating the data/power cables and also enclosing strength members.

16 Claims, 4 Drawing Sheets

HYDROPHONE CABLE CONSTRUCTION

BACKGROUND OF THE INVENTION

1. Field of the Invention

This invention relates to the construction of hydrophone acoustic arrays of the type which are towed behind vessels for seismic exploration and ship or submarine detection.

2. Discussion of the Background

Conventional towed acoustic arrays have consisted of a number of acoustic sensors, linked together with power and data cables and strength members, surrounded by a flexible enclosure and filled with a low density fluid to achieve neutral buoyancy. In recent years, military applications especially have provided an impetus for a progressive and continual improvement in performance, together with a quest for a reduction in array diameter. New materials, such as polyurethane thermoplastics, and strength members formed of aramid fibres, such as those sold under the Registered Trade Mark "KEVLAR", have enabled the implementation of performance improving techniques, such as the co-extrusion of the strength members within the polyurethane jacket forming the outer wall of the array. Such techniques are well established and are known, for example, from French Patent No. 80,27511, awarded to R L Gason Bon in 1980. Furthermore, with ministurization of the sensors and their associated electronics has come a reduction in the diameter of the array.

However, a number of limitations in this type of array still exist. As shown in FIG. 1, a prior art array 1 of this type basically consists of a number of acoustic modules 2, each containing a number of acoustic sensors 3 spaced at intervals along the length of the module 2. Each sensor 3 (which is normally comprised of a number of separate elements) is connected to data-carrying cables 4 running along the length of the array 1. Strength members 5 are also provided along the length of the array to withstand the towing strain when the array is towed. The strength members 5 and the data cables 4 are separated by a spacer 6 and the whole assembly is encased in a polyurethane hose wall 7. The interior spaces 8 in the array modules are filled with a low density fluid so as to counteract the weight of the components and thus provide an array with neutral buoyancy overall.

The problems with these types of arrays include the high cost of manufacture (due to the labor-intensive processes involved), minimal robustness (putting constraints on array handling systems), array self-generated (due to waves travelling in the internal fluid-filled hose), and leakage of the fluid (resulting in a loss of buoyancy and hence degradation of performance).

Arrays of this configuration usually have a large minimum bending radius, below which buckling of the hose wall occurs. When this happens in storage, for example on a winch drum, the material can take on a permanent set, resulting in increased array self-generated noise upon on subsequent deployments. Array self-generated noise is also due to waves travelling in the fluid filling the array and reflecting and scattering from any internal discontinuities provided by hose wall spacers, the acoustic sensors and their interconnecting wiring. Any increase in array self-noise degrades the acoustic performance of the array. Any leakage, whether due to a failed joint or a tear in the array hosewall, will result in deflation of the array, and subsequent ingress of sea-water with associated damage of the electronics in the array.

BRIEF SUMMARY OF THE INVENTION

It is therefore an object of the present invention to provide an acoustic array and an acoustic sensor module for such an array that overcome or at least reduce the above disadvantages.

Accordingly, in one aspect of the present invention there is provided an acoustic sensor module for an acoustic array of the type suitable for towing behind vessels, the module being generally cylindrical in shape and comprising:

a fluid tight enclosure, provided by a jacket and associated end caps, acoustically absorptive spacers dividing the module into a number of "sealed sub-enclosures", a plurality of acoustic sensors mounted within each of the sub-enclosures, and having connecting leads passing to, power and data cables running within the jacket, open cell plastic foam filling the spaces within the enclosure, a low density fluid filling substantially all voids within the foam, thin strengthening rings spaced apart along the module length, and longitudinal strength members running within the jacket.

In a preferred embodiment the filling provides a soft mounting for the sensors, and also for associated electronics packages. Leads from the sensors and electronics have a small diameter, and pass out radially through the foam to the data cables in the jacket wall. The use of the acoustically absorptive spacers is constrained to sections of the array where the sensors are widely spaced. Clearly, if the array is relatively short such that the sensors are not widely spaced, no spaces will be required. The interior voids are filled with a low density fluid via a valve in the inter-modular end connector. Control of the density and volume of the fluid fill provides control over the module buoyancy.

This embodiment allows the use of manufacturing techniques that do not limit the module length, as is the case with current arrays. This provides an array with fewer connectors, and hence greater overall reliability. The strengthening rings provide the required improvement for handling and winching; the removal of cables, strength members and spacers from the inner void provides the required improvement in acoustic self-generated noise performance, and the manufacturing methods involved (removing much of the previous manual operations), provide the sought-after reduction in cost. The sub-division of long modules into sealed enclosures by the introduction of acoustically damping solid sections overcomes the catastrophic failure mode of current arrays when ruptured at a single point. Hence the major limitations of previously existing arrays are overcome.

According to a second aspect of the invention there is provided an acoustic array comprising a plurality of modules of the type described above, each containing a plurality of acoustic sensors longitudinally spaced apart, supported in open cell plastic foam with groups of sensors separated by spacers of damping material therebetween, the sensor enclosures and the spacers being encased in a first, inner, jacket of vibration damping material, with strength members and power/data-carrying cables extending longitudinally within the jacket material.

Preferably a second, outer jacket is arranged outside the first jacket to provide a further layer of protection for the array. This outer jacket can be applied either as a co-extrusion simultaneously with the inner jacket or separately in a second pass through the extruder. Preferably, the latter method is used to provide continuous protection over the inter-modular connectors, enhancing the overall reliability of the array. In addition, a feeder tube is provided between the towing ship and the array proper, and through which low density fluid can be introduced into, or extracted from, the array to provide for fine control of the desired neutral buoyancy.

BRIEF DESCRIPTION OF THE DRAWINGS

One embodiment of an acoustic array according to the invention will now be more fully described, by way of example, with reference to the drawings, of which.

DESCRIPTION OF THE PREFERRED EMBODIMENT

Figure 1:
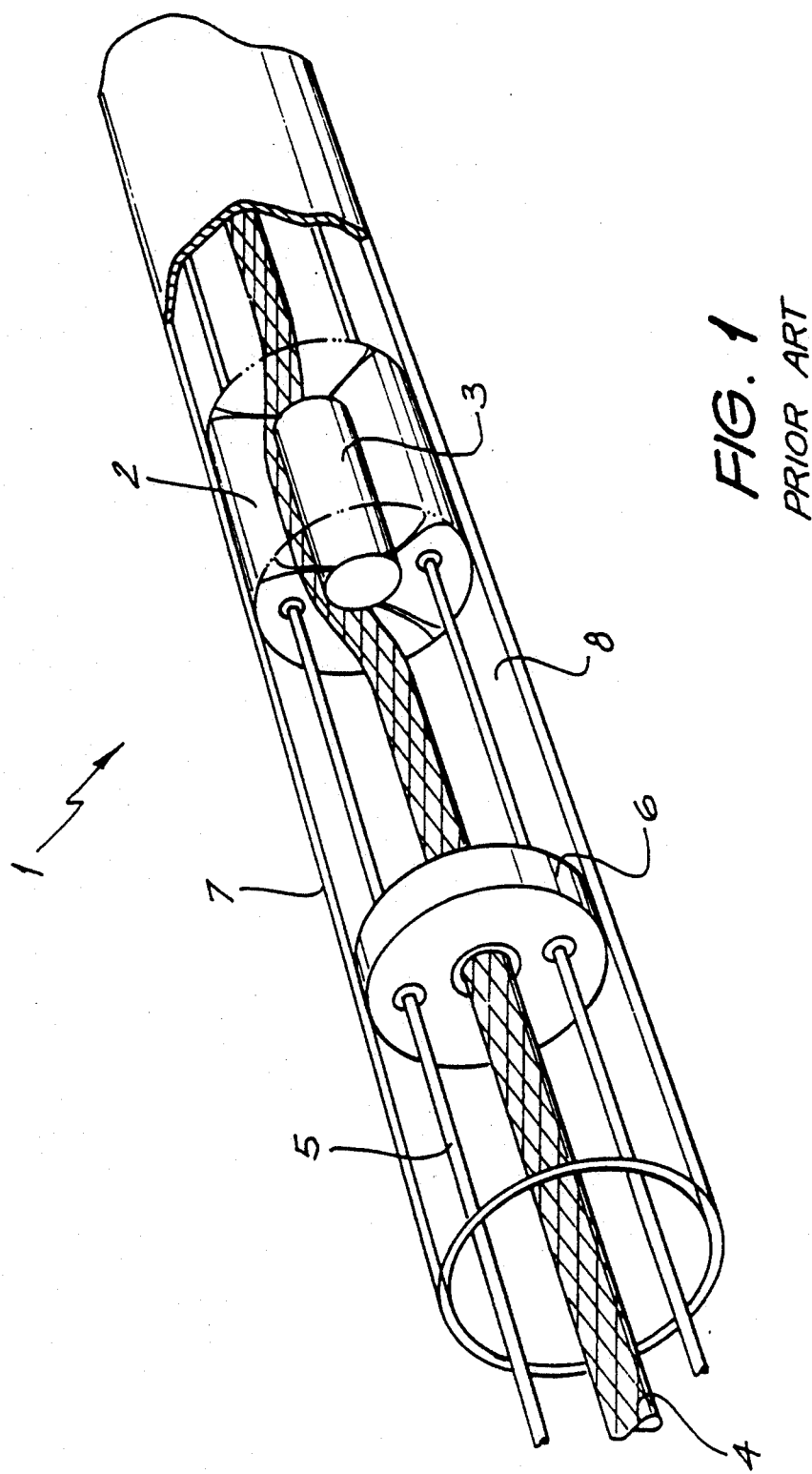
FIG. 1 schematically illustrates a conventional acoustic array as has been described above.
Figure 2:
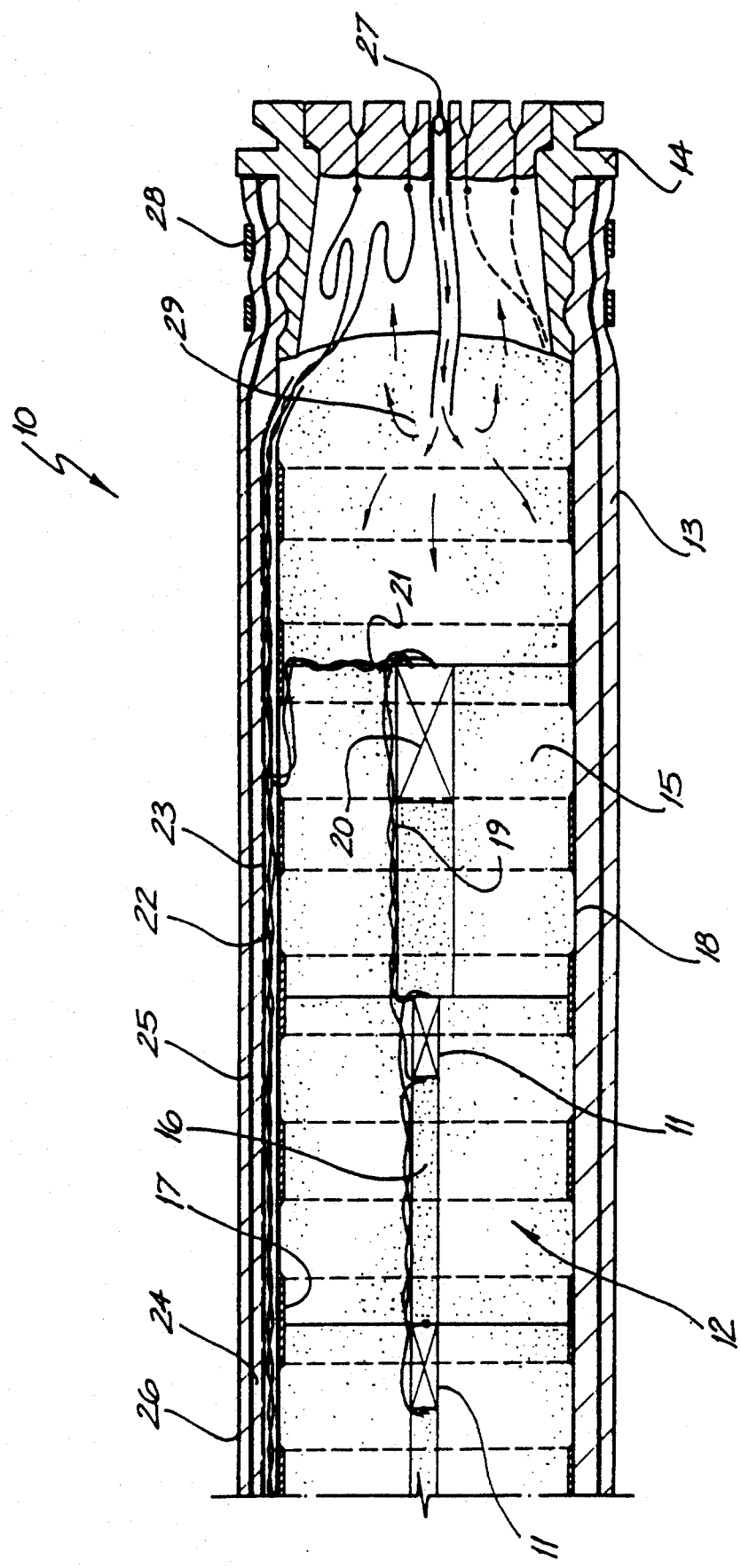
FIG. 2 is a longitudinal cross-section view through an acoustic sensor module, according to the preferred embodiment.

Thus, as shown in FIG. 2, one aspect of the preferred embodiment involves the provision of an acoustic sensor module 10, which contains groups of single sensor elements 11 within a fluid-tight enclosure 12. The enclosure 12 is bounded by the reinforced hosewall 13 and the module end caps 14 at either end of the module 10. The sensors 11 are mounted in the center of the enclosure by any suitable means, a preferred means being to utilizing tubular foam spacers 15 for this purpose; smaller cylindrical foam spacers 16 fill the central space between sensors. Radial stiffness is provided to the spacers 15 by thin annular rings 17, preferably made from fiber-reinforced plastic material, held in location by fine strength cords 18, preferably of aramid fiber material such as KEVLAR, glued to each ring. Thin flexible wires 19 connect the sensor elements 11 of each group to the pre-amplifying/multiplexing electronic package 20, the connecting leads 21 therefrom being brought out to the outer surface through a division between spacers 15.

When the components are assembled as above, data and power cables 22 are spirally wrapped around the outer diameter, with an over-wrap of fine fiber or plastic tape 23 to lock them into position. The connecting leads 21 to the electronic packages 20 are then spliced into their respective data/power cables 22.

An inner jacket of flexible, low density, acoustically damping thermoplastic material 24 is then extruded over the assembly described above, encapsulating the data/power cables 22 and also enclosing strength members 25, preferably of aramid fiber material such as KEVLAR, drawn through in an annular configuration around the major assembly during the extrusion process. A second, outer jacket 26 of a tough, flexible thermoplastic material is extruded over the inner jacket 24. This may be done simultaneously with the inner jacket as a co-extrusion, or later as a second pass.

To complete the integrity of the sensor enclosure, the end caps 14 may comprise electro-mechanical connectors custom designed and containing a fluid-filling valve 27, these correctors installed at each end of the module 10 and retained with compression bands 28. The module 10 is then filled via the valves 27 with a low density fluid 29, preferably paraffin-based, to exclude all gas from the interior space, and to give the module a predetermined overall buoyancy.

Figure 3:
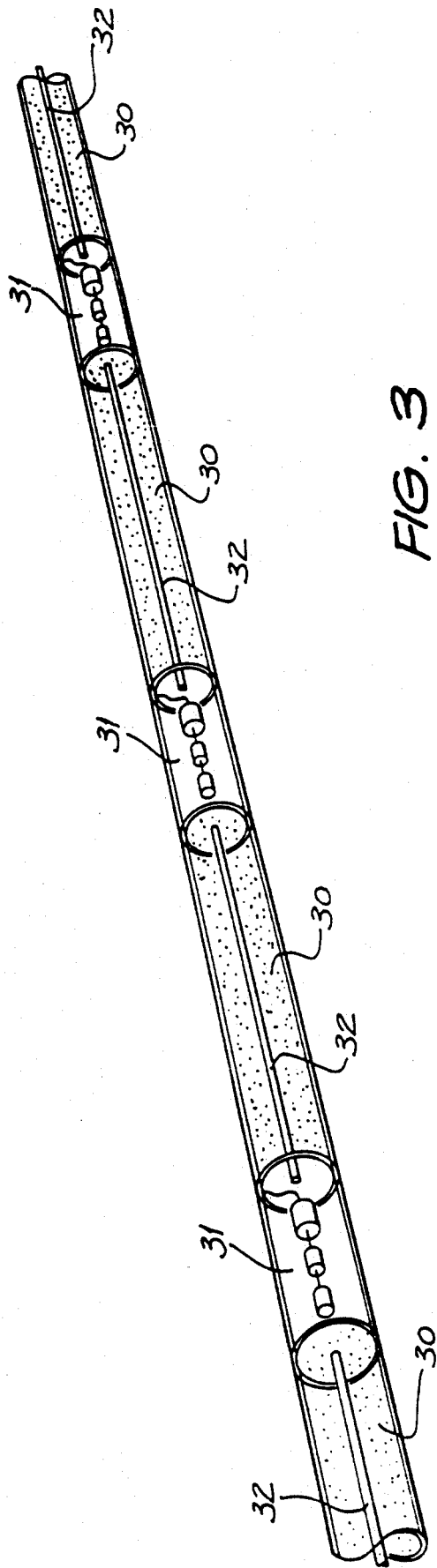
FIG. 3 shows a long module with widely spaced sensor groups partitioned into a number of sealed sub-enclosures by the addition of acoustically absorbing solid sections between them.

A second aspect of the preferred embodiment addresses the problem of leakage of fluid from long modules that are characteristic of low frequency arrays. According to this aspect, as shown in FIG. 3, there are provided blocking sections of damping material 30 to occupy much of the space between groups of sensor elements, thereby providing a plurality of separate enclosures 31. The blocking sections 30 are fitted with a capillary tube 32 to enable interconnection and hence filling of the interconnected enclosures. Upon the rupture occurring of any one enclosure 31, the capillaries 32 prevent the rapid flow-through of fluid from adjacent enclosures, and hence prevent a sudden and catastrophic failure of the complete array. It will also be apparent that the creation of individual enclosures, bounded by vibration absorbing "solid sections" will prevent the progression of internal "bulge" waves along the array, thereby contributing to a further reduction in array self-generated noise.

Figure 4:
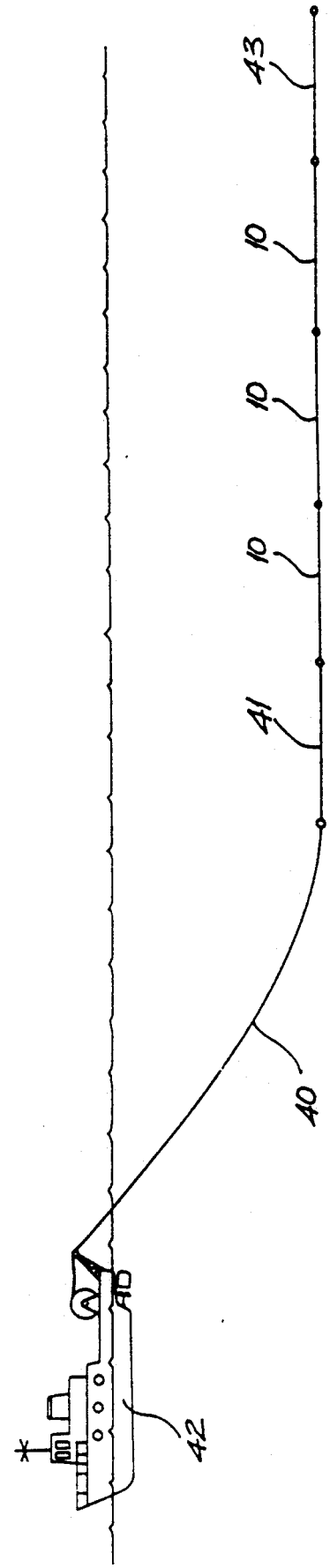
FIG. 4 schematically shows a number of the modules of FIG. 2 arranged to form an array.

A third aspect of the preferred embodiment addresses the problem of maintaining neutral buoyancy in the ever-changing ocean conditions. In order to form an acoustic array utilizing this third aspect, a number of acoustic modules 10, of the type described above, are connected in-line, as shown in FIG. 4. The entire arrangement thus comprises a tow cable 40, a leading vibration isolation module 41, the array modules 10, and a tail vibration isolation module 43. The fluid filling valves 27 of adjacent modules are also mated during this interconnection providing a path for the injection/extraction of fill fluid 29. A feeder tube (not illustrated) provides fill fluid, via the tow cable 40 and vibration isolation module (VIM) 41, from the towing ship 42 to the array. When required to increase buoyancy, additional fluid is pumped into the array; to reduce it, fluid is drawn off. Thus continual control is effected to maintain buoyancy at the critical neutral value.

Figures 5, 6:
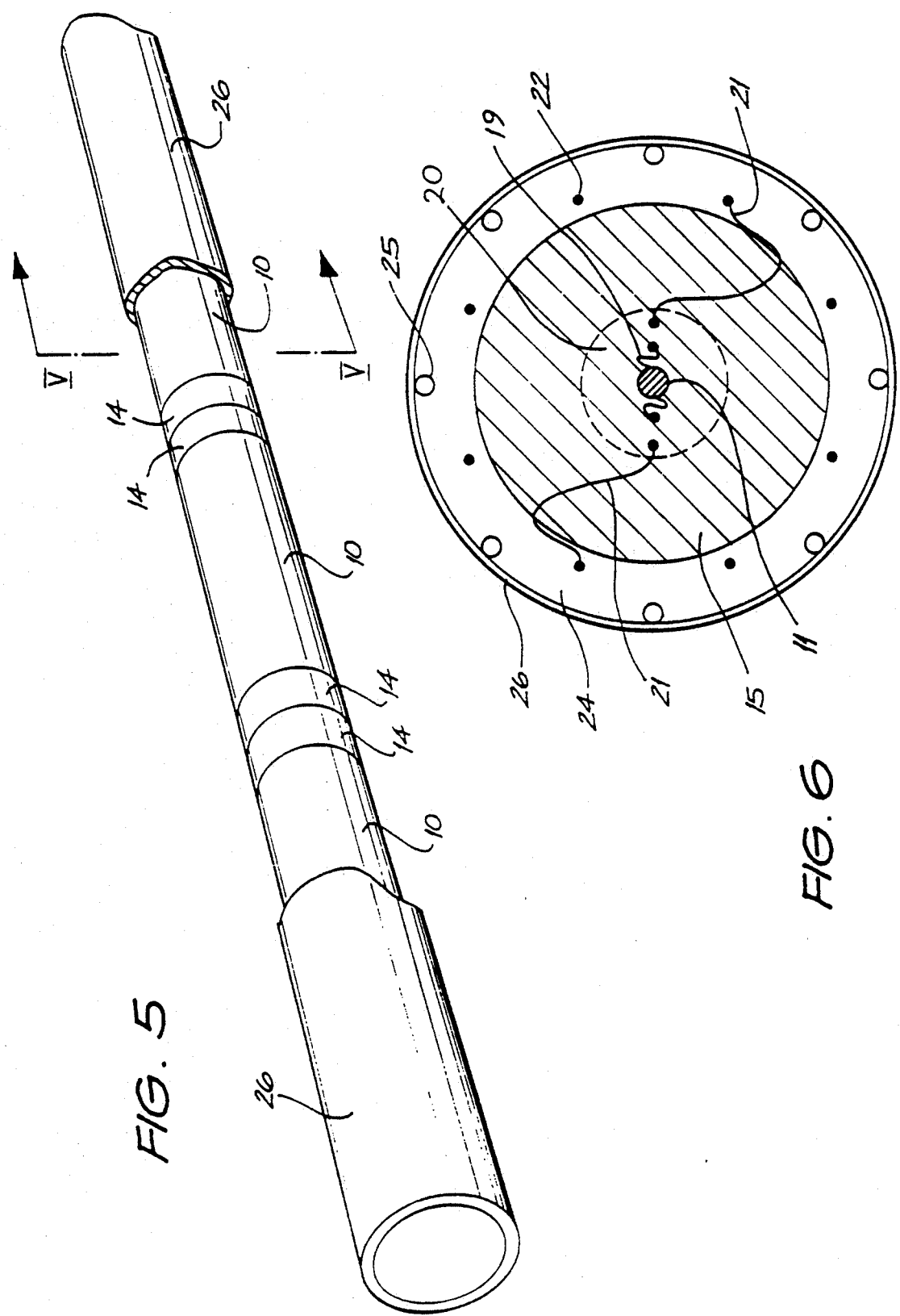
FIG. 5 schematically shows the array of FIG. 4, with the outer jacket extruded over the connectors.
FIG. 6 is a transverse cross-sectional view through the array of FIG. 5 on line V—V thereof.

A fourth aspect of the preferred embodiment is illustrated in FIG. 5. The modules 10 can be connected together at the end connectors 14 to comprise an array, and the complete array then encased in the outer-jacket 26 of a tough thermoplastic, preferably polyurethane. This measure provides jacket continuity over the connectors, thereby minimizing the possibility of sea-water ingress at these points, and hence improving overall reliability. By making this jacket 26 of a material having a density different from that of the inner jacket 24, the weight and density of the final array can be controlled by varying the thickness of the outer jacket 26. Further control is then exercised by varying the density and/or quantity of the fluid fill 29.

The cross-sectional view of FIG. 6, taken through one of the acoustic sensor elements 11, shows the element 11, suspended in the foam spacers 15, and connected by interconnecting wires 19 to the amplifier module 20. Connecting leads 21 from the amplifier module are spliced into the data cables 22, which are encased in the inner jacket 24, which also encloses the strength members 25. An outer jacket 26 encases the whole.

The foregoing describes only some aspects of an embodiment of the present invention and modifications, obvious to those skilled in the art, can be made thereto without departing from the scope of the present invention.

What I claim is:

1. An acoustic sensor module for an acoustic array of the type suitable for towing behind vessels, the module being generally cylindrical in shape and comprising:
   a fluid-tight longitudinal enclosure, provided by an extruded thermoplastic material jacket having inside and outside surfaces and end caps;
   open cell plastic foam for filling spaces within the enclosure;
   a plurality of acoustic sensors mounted at intervals along the length of the enclosure and utilizing the foam as a vibration isolating mounting, the sensors having connecting leads passing through the foam;
   a plurality of thin, strengthening rings positioned around the foam within the jacket and spaced apart along the length of the enclosure;
   a plurality of power and data cables and a plurality of longitudinal strength members, the cables and strength members extending longitudinally within the thermoplastic material of the extruded jacket between inside and outside surfaces thereof; and
   a low density fluid for substantially filling all voids within the enclosure.

2. An acoustic sensor module according to claim 1, wherein the leads from the sensors have a small diameter and pass out radially through the foam to the data cables within the jacket.

3. An acoustic sensor module according to claim 1, wherein the foam provides a soft mounting for the sensors.

4. An acoustic sensor module according to claim 1, which comprises a plurality of spacers dividing the enclosures into a plurality of sub-enclosures.

5. An acoustic sensor module according to claim 4, further comprising an electronic package associated with the sensor mounted within each sub-enclosure and having leads passing therethrough.

6. An acoustic sensor module according to claim 5, wherein the leads from the electronics package have a small diameter and pass out radially through the foam to the data cables within the jacket.

7. An acoustic sensor module according to claim 5, wherein the foam filling provides a soft mounting for the electronics packages.

8. An acoustic sensor module according to claim 4, wherein said spacers are acoustically absorptive.

9. An acoustic sensor module according to claim 4, wherein the use of the spacers is constrained to sections of the module where the sensors are widely spaced.

10. An acoustic array according to claim 9, which comprises a second, outer, jacket arranged outside the extruded thermoplastic jacket to provide a further layer of protection for the array.

11. An acoustic array according to claim 9, which comprises a feeder tube provided between a towing ship and the array, and through which low density fluid can be introduced into, or extracted from, the array to provide for fine control of the desired neutral buoyancy.

12. An acoustic sensor module according to claim 1, wherein the interior voids are filled with the low density fluid via a valve in one of the module end caps.

13. An acoustic array according to claim 12, which comprises a feeder tube provided between a towing ship and the array, and through which low density fluid can be introduced into, or extracted from, the array to provide for fine control of the desired neutral buoyancy.

14. An acoustic array according to claim 12, wherein the second outer jacket is applied either as a coextrusion simultaneously with the extruded thermoplastic jacket or separately in a second pass through an extruder.

15. An acoustic array comprising a plurality of modules wherein at least one of the modules comprises:
   a fluid-tight longitudinal enclosure, provided by an extruded thermoplastic material jacket having inside and outside surfaces and end caps;
   open cell plastic foam for filling spaces within the enclosure;
   a plurality of acoustic sensors mounted at intervals along the length of the enclosure and utilizing the foam as a vibration isolating mounting, the sensors having connecting leads passing through the foam;
   a plurality of thin, strengthening rings positioned around the foam within the jacket and spaced apart along the length of the enclosure;
   a plurality of power and data cables and a plurality of longitudinal strength members, the cables and strength members extending longitudinally within the thermoplastic material of the extruded jacket between inside and outside surfaces thereof; and
   a low density fluid for substantially filling all voids within the enclosure.

16. An acoustic array according to claim 15, which comprises a feeder tube provide between a towing ship and the array, and through which low density fluid can be introduced into, or extracted from, the array to provide for fine control of the desired neutral buoyancy.

* * * * *